Figure 10:
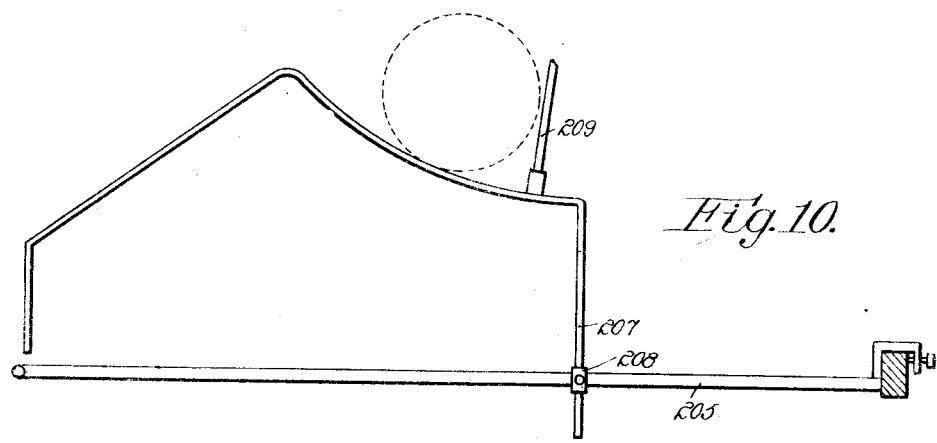

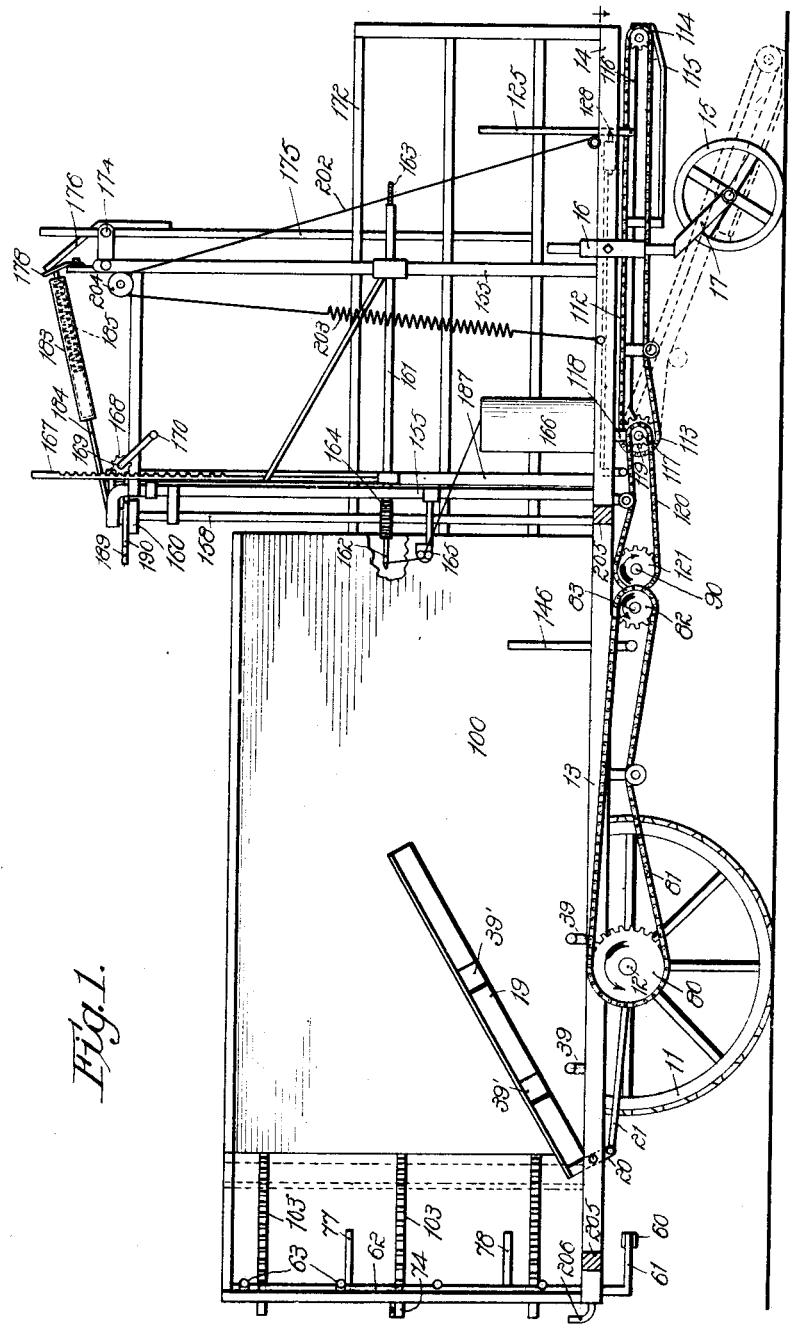

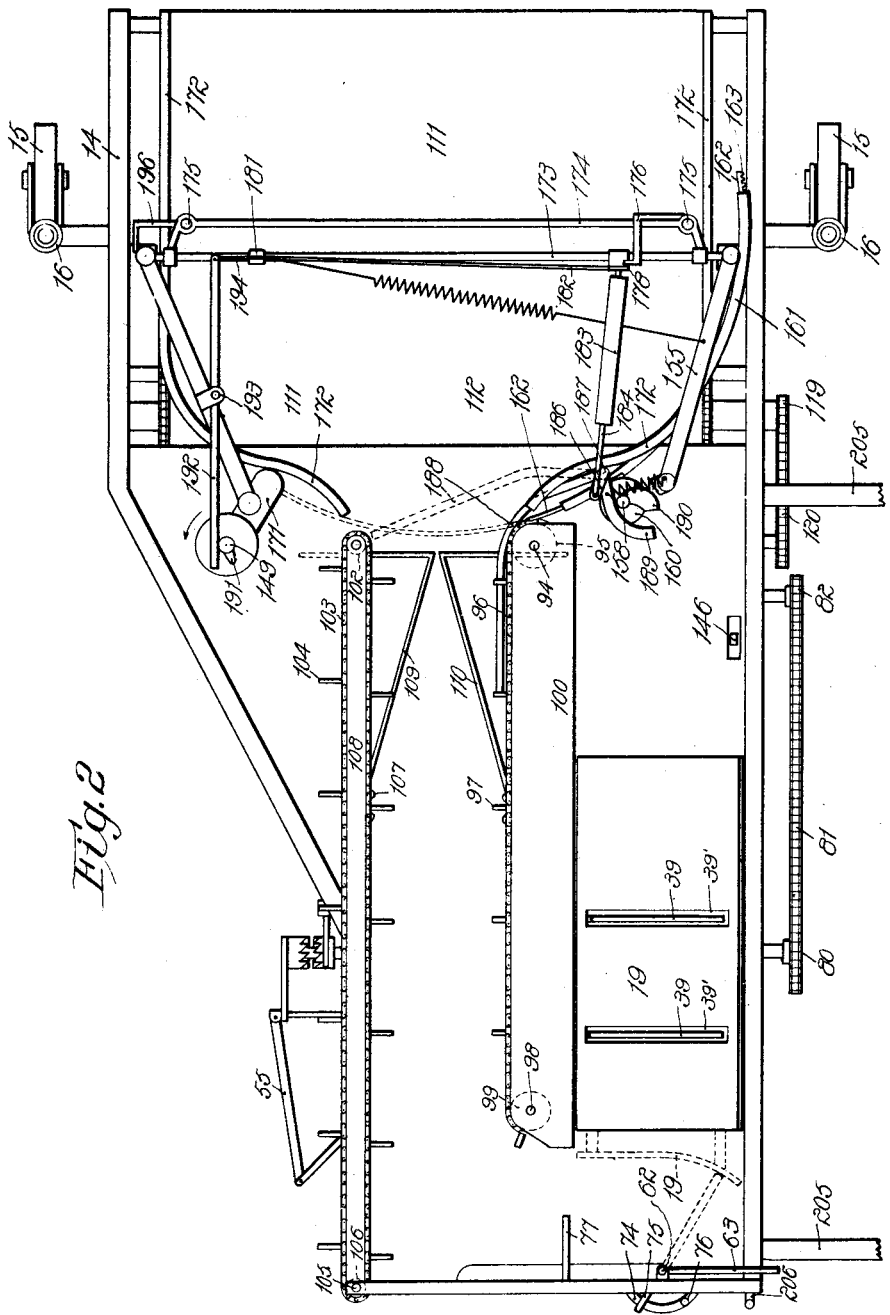

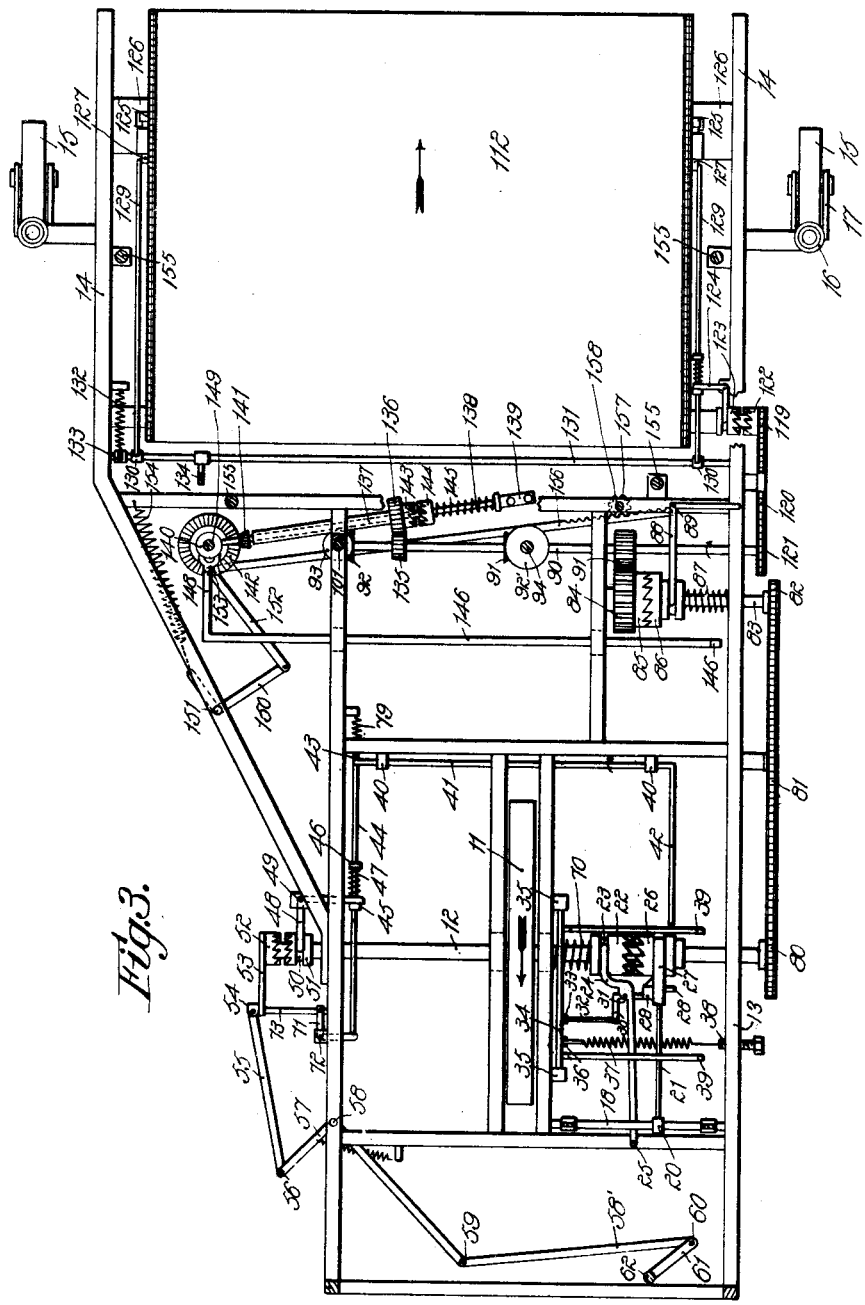

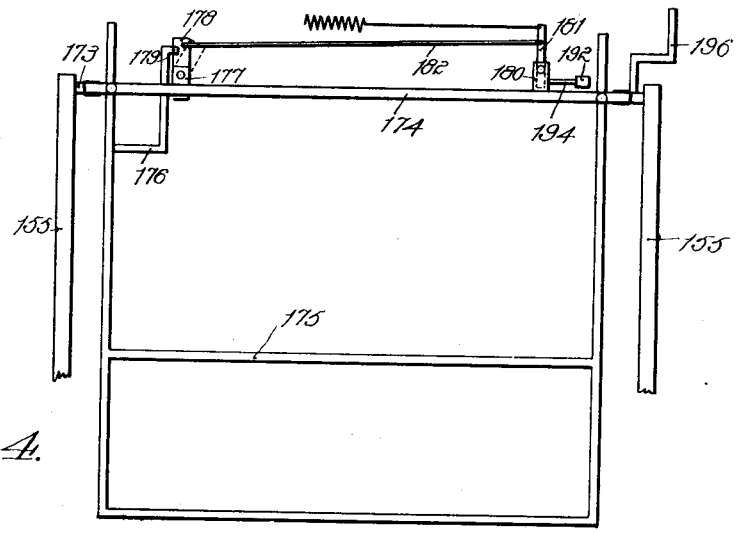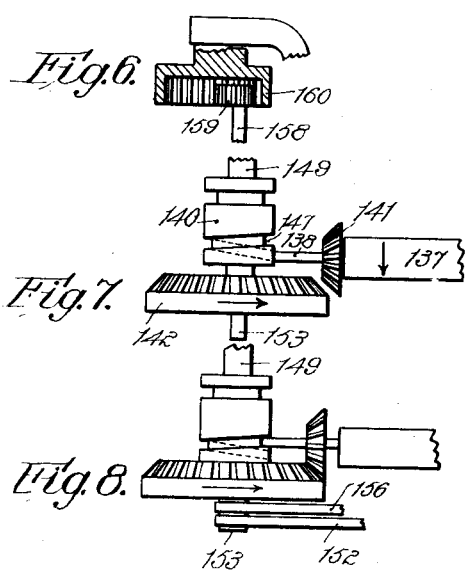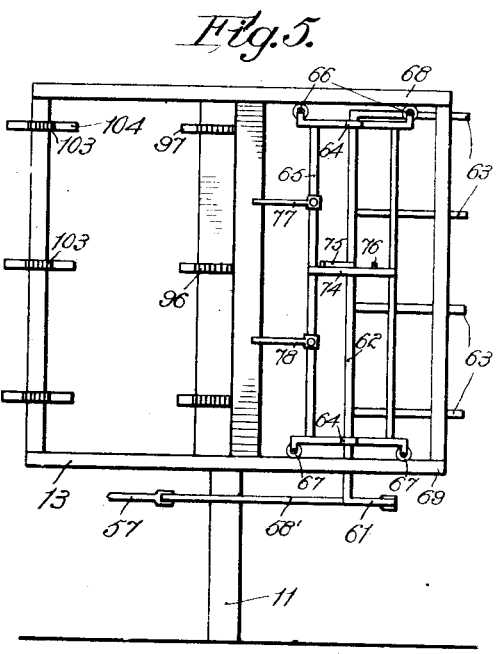

F. W. HART & O. E. BARBER.
GRAIN SHOCKER.
APPLICATION FILED AUG. 14, 1914.

1,182,846.

Patented May 9, 1916.
5 SHEETS—SHEET 5.

Witnesses:
Robert F. Brack
Herman A. Neuburger

Inventors
Floyd W. Hart
Orrero E. Barber
By Lynn A. Williams
Attorney

UNITED STATES PATENT OFFICE.

FLOYD W. HART, OF CHICAGO, ILLINOIS, AND ORREN E. BARBER, OF SIOUX CITY, IOWA.

GRAIN-SHOCKER.

1,182,846.  Specification of Letters Patent.   Patented May 9, 1916.

Application filed August 14, 1914. Serial No. 856,783.

*To all whom it may concern:*

Be it known that we, FLOYD W. HART and ORREN E. BARBER, citizens of the United States, residing at, respectively, Chicago, in the county of Cook and State of Illinois, and Sioux City, in the county of Woodbury and State of Iowa, have invented certain new and useful Improvements in Grain-Shockers, of which the following is a full, clear, concise, and exact description, reference being had to the accompanying drawings, forming a part of this specification.

Our invention relates to grain shockers, and the object thereof is to provide a machine of this class which can be attached to a harvester so as to receive bundles of grain from the harvester and automatically tie up and deposit on the ground in an upright position any number of such bundles.

In the preferred embodiment of our invention herein shown and described, we provide a moving door or platform positioned at the front of the shocker. This door is arranged to receive the bundles as they are automatically deposited thereon by the harvester. The door is so arranged that the bundle will automatically cause the same to be operated, due to its weight upon the door. The door when in position to receive the bundle is in a substantially horizontal plane, but as soon as a bundle is deposited thereon, mechanism is employed for moving the door about a pivot so as to move the door and bundle to a vertical position. After the bundle has been moved to a vertical position, suitable traveling lever mechanism is employed for transmitting the bundle to a carriage. This carriage may be of any suitable construction, but in the particular embodiment herein shown we employ an endless chain for this purpose. By means of the endless-chain mechanism, the bundle is carried to an enlarged inclosure, which is arranged to receive from twelve to sixteen bundles of grain. After a suitable number of bundles are positioned in the inclosure, a lever is manually operated so as to actuate mechanism for pressing the bundles together. After the bundles are tightly pressed, a knotter is manipulated and the bundles are tied into one large bundle. The inclosure above referred to is provided with a movable floor or platform and has mounted thereon an endless belt. When the platform is in its closed or non-operating position the endless belt is stationary, but as soon as the platform is moved to deposit the grain, the endless belt is caused to operate and deposit the grain.

Our invention will be more clearly understood by referring to the accompanying drawing, in which—

Figure 9:
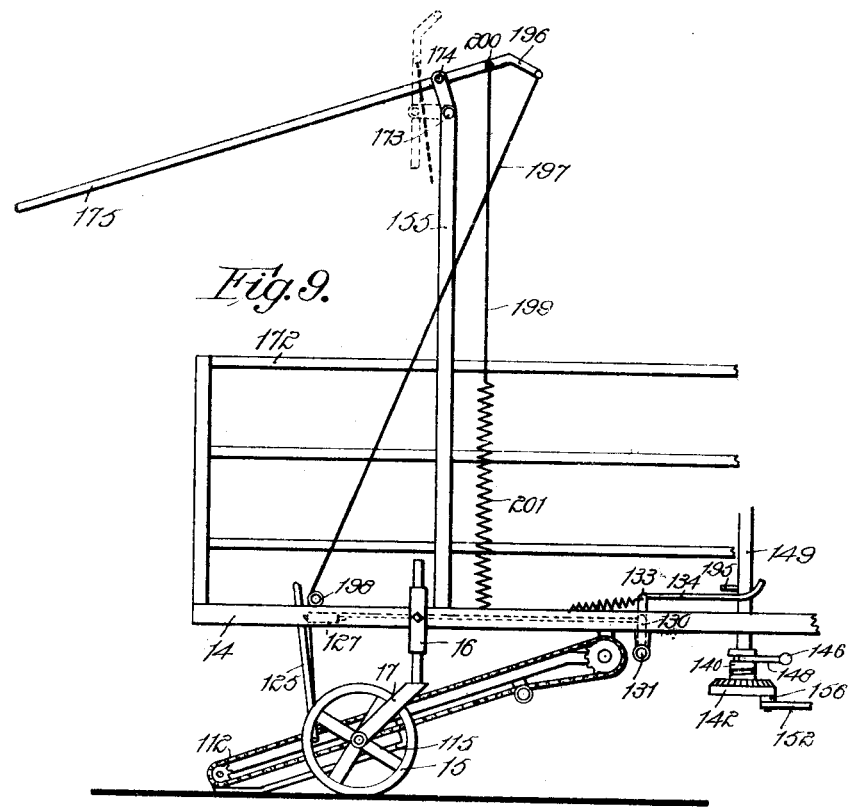

Figure 1 is a side elevational view of the grain shocker of our invention, the movable door member being shown in its partly operated position; Fig. 2 is a plan view of the shocker shown in Fig. 1, the moving door being shown in a horizontal position in this figure; Fig. 3 is a horizontal sectional view taken along the line 3—3 of Fig. 1 and looking in the direction indicated by the arrows; Fig. 4 is a detail end view of the packing arm used to pack the bundles when in the enlarged inclosure; Fig. 5 is a front elevational view of Fig. 1; Fig. 6 is a detail view of the internal gear mechanism and its associated pinion, which are employed in operating the packer arm shown in Fig. 4; Fig. 7 is a detail view of the clutch mechanism which is manually controlled to place the machine in an operative condition; Fig. 8 is a view similar to Fig. 7, showing the clutch mechanism in operating position; Fig. 9 is a fragmentary side elevational view similar to Fig. 1, but taken form the other side of the machine, the movable floor or platform in this figure being shown in position to deposit the bundles of grain; and Fig. 10 is a front elevational view of the chute mechanism which is secured to the harvester.

Similar reference figures refer to similar parts throughout the several views.

Referring to Fig. 3, a tractor wheel is shown at 11, which is rigidly secured upon a shaft 12 bearing in the framework of the shocker 13. The rear end of the shocker terminates in a framework 14, 14, which serves to support wheels 15, 15. Each of the wheels 15 is adjustably supported in a collar 16, so that adjustment of the rear end of the shocker is had. As clearly shown in Fig. 1 of the drawings, the wheel 15 is journaled at the end of an arm 17 which extends upwardly in an oblique direction.

Journaled in the framework 13 of the shocker is a shaft 18, which has rigidly secured thereon a moving door or hopper 19. Extending downwardly and rigidly secured to the shaft 18 is an arm 20 pivotally secured to a rod 21. It will readily be seen from the description thus far given that the door or hopper 19 may be moved to an upright position by merely pulling the rod 21 to the right (Fig. 1). Keyed to the shaft 12, but slidably mounted thereon, is a clutch member 22 provided with a groove 23 adapted to receive a forked lever 24 pivoted at 25 to the framework 13 of the shocker. Loosely mounted upon the shaft 12 is a second clutch member 26 arranged to coöperate with the clutch member 22 when said last-mentioned clutch member is brought into mesh with the clutch member 26. The clutch member 26 is provided with an eccentric 27, which is connected with the rod 21. Connected to the inner or rotating member of the eccentric is a pin 28, the object of which will presently be described. Mounted on the opposite side of the rotating member of the eccentric from the pin 28 is a bevel cam member 29 arranged to engage a bell crank lever 30 pivoted at 31 to the forked rod 24. The bell crank lever 30 is connected by means of a link 32 to a downwardly extending arm 33 rigidly secured to a shaft 34 mounted in bearings 35, 35, in the framework of the shocker. Secured to the shaft 34 and extending downwardly is a second arm 36, similar to the arm 33, which has secured at the end thereof an adjustable spring 37 mounted at 38 on the framework. Arranged to extend through slots 39' in the hopper or door are a plurality of rods 39, 39, which are rigidly mounted on the shaft 34.

It will readily be seen from the description thus far given that the spring 38 will tend to rotate the rod 34 to swing the arms 39 upwardly. Mounted in bearings 40, 40, in the framework, is a rod 41 provided with an extension 42 which is arranged to be operated by the pin 28 on the eccentric when the same is rotated. The rod 41 is provided at its other end with a downwardly extending arm 43, which in turn is connected to a second rod 44. Mounted upon the rod 44 are a pair of bolts 45 and 46, between which is disposed a spring 47. A bell crank lever 48, pivoted at 49, is provided with an aperture through which the rod 44 passes. The other end of the bell crank lever 48 is arranged to engage a groove 50 in the clutch member 51 keyed to the shaft 12, but slidably mounted thereon. A second clutch memebr 52 is arranged to coöperate with the clutch member 51, but is loosely mounted on the shaft 12 on the outside of the clutch member 51. An arm 53, which is bolted or otherwise secured to the clutch member 52, is provided at its left-hand end (Fig. 3) with a pivoted member 54, to which is secured a link 55. The link 55 in turn is pivotally mounted at 56 on a bell crank lever 57, which in turn is pivoted at 58 to the framework. Secured to the bell crank lever 57 at 59 is a second link 58', which is pivotally mounted at 60 on a lever 61. This lever 61, as most clearly shown in Figs. 1 and 5, is an extension of a vertical rod 62. Secured to the rod 62 are a plurality of arms 63, which arms are arranged to swing about the pivot 62 when the lever 61 is operated, as shown in Fig. 2 of the drawings.

The rod 62 is mounted in bearings 64, 64 in a framework 65, which is provided with rollers 66, 66, and 67, 67, at the top and bottom, respectively. The rollers 66 and 67 are arranged to engage rails 68 and 69 on the top and bottom of the framework.

We will now explain the operation of the mechanism thus far described.

The door or hopper 19 is normally in the position shown in Fig. 2, resting below the arms 39, 39, shown in Fig. 3. The arms 39, 39 and bell crank lever 30 are in the position illustrated in Fig. 3, when the door is in its down position without the weight of a bundle of grain thereon. As soon as a bundle of grain is deposited upon the arms 39, the weight of the bundle causes the levers 39, 39 to swing downwardly on their pivot shaft 34. This downward movement of the levers 39 causes the downwardly extending arms 33 and 36, respectively, secured to the link 32 and spring 37, to move in a direction toward the tractor wheel. This movement of the link 32 causes the bell crank lever 30 to rotate upon its pivot 31 in a clockwise direction (Fig. 3) to disengage the cam portion 29 mounted on the eccentric 27. At the moment the bell crank lever 30 disengages the cam portion 29 of the eccentric, the clutch member 22 is caused to engage the clutch 26, due to the spring 70 interposed between the clutch 22 and the framework of the shocker. Due to the movement of the shocker, the tractor wheel is rotated in the direction indicated by the arrow in Fig. 3. After the clutch members 22 and 26 are brought into operative relation, the clutch 26 and eccentric 27 are caused to rotate in the direction indicated by the arrow. When the eccentric has been rotated 180° from the position illustrated in Fig. 3, the door will be in its upright position, shown in dotted lines in Fig. 2, in which position the door deposits its bundle of grain, to be taken care of by mechanism subsequently to be described. When the door is almost in its vertical position, the pin 28, which is mounted on the rotatable member of the eccentric, engages the arm 42 of the rod 41 and causes the same to be slightly rotated in the direction indicated. Due to the connections between the rod 41 and rod 44, the rod 44 is caused to move in a direction toward the left (Fig. 3). This movement to the left of the rod 44 causes the clutch member 51 to move into engagement with the clutch 52 mounted upon the shaft 12. A bell crank lever 71, pivoted at 72 to the framework, has one end mounted on the left-hand end of the rod 44, and its other end secured to a locking lever 73 which extends into a slot provided in the arm 53. When the rod 44 is in the position indicated in Fig. 3, the locking lever 73 engages the crank 53 and prevents movement thereof; but as soon as the rod 44 is caused to move to the left, as described, the lever 71 is caused to rotate to disengage the locking lever 73 from the crank 53, and the bell crank lever 48 caused to lock the clutch members 51 and 52. As soon as the clutch members 51 and 52 are locked and the locking lever 73 is in its non-locking position, the crank 53 is caused to turn, due to its connection with the tractor of the shocker. This movement or turning of the crank 53 will be transmitted to the arm 61 of the vertical rod 62 through the link and bell crank connections shown in Fig. 3. The movement or turning of the crank 53 will first cause the vertical arm 62 to be rotated, causing the arms 63 to engage the bundle, as shown in Fig. 2. After the arms 63 have been moved to a predetermined position, they are locked against further rotation by means of a lock which is illustrated at 74, in the form of a semicircular rod, upon which is a sliding arm 75 secured to the rod 62, the rod 75 serving to engage a pin 76 mounted on the semicircular band 74. It will readily be seen, by referring to Fig. 2 of the drawings, that the arm 63 will be prevented from further rotation when the sliding arm 75 engages the stop pin 76. After the arms 63 are in their operated position and cannot be moved farther on account of the locking means, the entire framework 65 is caused to slide to the left (Fig. 5). Arms 77 and 78 may be connected with the movable frame 65. These arms 77 and 78 serve to retain a bundle in a vertical position, so that there is no possibility of the bundle being tipped when the carriage 65 is moved.

When the pin 28 disengages the lever 42, the lever 41 is again caused to move to its original position, due to the spring mechanism illustrated at 79, which is connected to the downwardly extending arm 43 and the framework. This return movement of the arm 41, of course, causes the return of the carriage 65 and the arms 63 to their original position. As the eccentric 27 is rotated back to its original position, the cam 29 engages the bell crank lever 30 and causes the forked lever 24 to disengage the clutch 22 from the clutch 26. The mechanism is then again in non-operating condition, and will not again be put in operation until a second bundle is deposited on the arms 39.

We will now describe the mechanism which we employ for carrying the bundles to the rear of the shocker, where they are tied into one large bundle.

Secured to the shaft 12 on the outside of the framework is a sprocket wheel 80 coöperating with a chain 81, which operates a second sprocket wheel 82 mounted on a shaft 83. The shaft 83 is suitably mounted in bearings in the framework, as indicated in Fig. 3. A gear 84, loosely mounted on the shaft 83, is provided with a clutch member 85 arranged to engage a second clutch member 86, which is keyed to the shaft 83, but slidably mounted thereon. A spring 87 disposed between the clutch 86 and the framework of the shocker is provided to normally hold the clutch members in locked position. A lever 88, pivoted at 89 to the frame, extends into a groove in the clutch 86 and serves to throw the clutch members into inoperative position when this is desired. Mounted in suitable bearings in the framework is a shaft 90, which is provided with a gear 91 meshing with the gear 84 on the shaft 83. It will be seen that any rotation of the shaft 12 due to the tractor wheel 11 is transmitted to this shaft 90 by means of the chain and gear mechanism described. Mounted on the shaft 90 are a pair of bevel gears 91 and 92, each one meshing, respectively, with a bevel gear 92' and 93. The gear 92' is mounted upon a shaft 94 which extends upwardly, as shown in Fig. 2, and is provided with a plurality of sprocket wheels 95, each one of which is arranged to coöperate with an endless chain 96 provided with fingers 97. A second sprocket-wheel shaft is provided at 98, at the forward end of the shocker, the sprocket wheels being shown at 99. A suitable casing is shown at 100, which is disposed between the hopper 19 and the chains, so that there is no possibility of the bundles being caught in the chains as they are deposited upon the hopper. We have shown three chains 96, but it will be understood that we may employ any number, to carry the bundles. The bevel gear 93 is provided with a shaft 101, which is similar in all respects to the shaft 94 coöperating with the bevel gear 92'. This shaft 101 has a plurality of sprocket wheels 102 each coöperating with an endless chain 103 provided with fingers 104. A shaft 105 at the forward end of the machine serves to pivotally mount a second set of sprocket wheels 106. Rigidly secured at 107 to the upright frame 108 is a spring 109 having its rear end free. A similar spring 110 is mounted on the upright frame 100.

From the description thus far given, it will be seen that the bundles which are carried to the chain 103 by means of the carriage 65 are grasped by the fingers 97 and 104 and are carried toward the rear end of the shocker. As the bundles are caused to pass between the springs 109 and 110, the springs are spread apart, but as soon as the bundle has passed the springs, onto the platform 111, the springs again move back to the position indicated, thereby preventing any of the bundles from again entering the passageway between the endless chains.

The platform 11¹ is in the form of an endless belt 112 mounted upon rollers 113 and 114. The roller 114 is mounted in a suitable bracket 115 secured to a flooring 116 disposed beneath the upper plane of the endless belt. The flooring 116 is secured at its left-hand end (Fig. 1) to a shaft 117, which is mounted, by means of brackets 118, on the framework. A sprocket wheel 119 mounted on the shaft 117, coöperating with a chain 120 and sprocket wheel 121, serves to connect the shaft 117 with the shaft 90. Rigidly mounted on the shaft 117 (Fig. 3) is a clutch member 122 arranged to coöperate with a second clutch member 123 keyed, but slidably mounted, on the shaft 117. A bell crank lever 124 pivoted to the frame serves to lock these clutch members when this is desired. As will be seen by referring to Fig. 1, the movable floor 116 is secured at its left-hand end to the framework, but has its right-hand end free, so that the entire floor and endless belt may be moved to the position indicated in dotted lines in Fig. 1, and in full lines in Fig. 9. As a means for retaining the movable floor in its upright position, we provide a pair of rods 125, positioned one on each side of the machine. Each of these rods extends up through an aperture in the plate 126 and is engaged by a locking member 127, which engages a notch 128 in the rod 125. Secured to each of the locking members 127 is a rod 129, which is connected at its other end by means of an arm 130 to a shaft 131 supported from the casing, as shown. The bell crank lever 124, which operates the clutch member 123, has one arm arranged to be operated by the movement of the rod 129 immediately adjacent thereto. The shaft 131 is held in the position shown by means of a spring 132 secured at one end to the framework and at the other end to a lever 133 on the shaft 131.

An operating lever 134 mounted on the shaft 131 serves when moved downwardly to cause the following operations: The mechanism for causing the downward movement of the lever 134 will be subsequently described, but suffice it to say here that when it is moved downward, each of the levers 129 is moved to the left (Fig. 3), disengaging the locking members 127 from their coöperating rods 125, permitting the door member to fall to the ground, as indicated in dotted lines in Fig. 1 and in full lines in Fig. 9. The movement of the rod 129 adjacent the clutch member 123 causes the bell crank lever 124 to be operated to cause the clutch members 122 and 123 to be locked. Just as soon as the clutch members above referred to are locked, rotation of the shaft 12 is transmitted to the shaft 117 of the endless belt, so that when the door is in the position illustrated, or slightly before it reaches this position, the endless belt is caused to travel in the direction indicated by the arrow (Fig. 3).

Mounted on the shaft 90 is a bevel gear 135 meshing with a bevel gear 136 mounted on a sleeve 137. The sleeve 137 is provided with suitable bearings extending from the framework of the shocker. Extending through the sleeve 137 is a rod 138 slidably mounted in a sleeve 139 secured to the framework. The opposite end of the rod 138 is arranged to engage a cam 140, and is provided with a bevel pinion 141 arranged to coöperate with a bevel gear 142 when the bevel pinion is moved into engagement therewith. The bevel pinion 136 is provided with a clutch member 143 adapted to coöperate with a second clutch member 144 rigidly mounted on the rod 138. A spring 145 serves to move the clutch 144 into engagement with the clutch member 143 when the cam 140 permits the rod 138 to be moved in this direction. The cam 140 is normally in position to prevent engagement of the bevel pinion 141 and the bevel gear 142. A manually controlled lever 146, having bearing in the framework, is provided for moving the cam 140 to a position permitting the bevel gear 141 to mesh with the bevel gear 142. After a predetermined rotation of the gear 142 by the pinion 141, the cam 140 is caused to automatically disengage the pinion 141 from the bevel gear 142. The operation of this cam mechanism will now be described.

Referring to Fig. 7 of the drawings, the gears 141 and 142 are in the position shown in Fig. 3. The cam 140 is in the form of a cylinder, provided with a spiral groove 147 which encircles the cylinder 140. The groove 147 at its upper end is of the depth shown in Fig. 7. This depth continues almost entirely around the cylinder 140, other end of the groove gradually sloping outwardly to the periphery of the cylinder 140. When the lever 146 is operated, the forked end 148 of this lever causes the cam 140 to be moved to the position shown in Fig. 8. When the cam has moved to this position, the deep end of the groove 147 is in position adjacent the end of the rod 138 and permits the same to be pushed forward by means of the spring 145. By means of the engagement of the gears 141 and 142, the shaft 149, which is secured to the bevel gear 142, is caused to rotate. The cam 140, which is keyed to the shaft 149, but slidably mounted thereon, is therefore also caused to rotate in the direction indicated by the arrow 150 in Fig. 8.) As the cam 140 rotates, the rod 138 extending into the groove 147 causes the cam or cylinder 140 to be lifted, the rod 138 riding in the groove 147. When the lower end of the groove 147 is reached, the rod 138 will be engaged by the outwardly extending cam portion of the groove 147, which will effectually disengage the gears 141 and 142. In order to move the cam 140 in position far enough to disengage the gears above referred to, we provide a bell crank lever 150, pivoted at 151 to the frame. Secured to one end of the bell crank 150 is a link 152 secured to a downwardly extending pin 153 in the gear 142. A spring 154 connects the other end of the bell crank lever 150 to the frame of the shocker. Referring to Figs. 3 and 9, it will readily be seen that the spring 154, bell crank lever 150 and link 152 serve to rotate the shaft 149 and cam 140 a slight distance after the gears 141 and 142 are moved out of mesh.

Positioned at the rear of the shocker and extending upward from the framework thereof, are a plurality of bars 155 which serve as a framework for the needle, knotter, packer arms, etc., which will subsequently be described. Secured to the downwardly extending pin 153 of the gear 142 is a rack 156, which meshes with a pinion 157 mounted on the end of a vertical shaft 158. The shaft 158 extends upwardly and terminates in a pinion 159 within an internal gear 160, as clearly shown in Fig. 6. The internal gear 160 is supported by means of a bracket on one of the frame bars 155. Secured to the frame bars 155 is a somewhat semicircular casing 161 arranged to accommodate a needle 162. The needle is provided with teeth 163 arranged to mesh with a gear 164 mounted on the shaft 158. A suitable opening is provided in the casing 161 to permit the gear 164 to engage the teeth on the needle. A pair of rollers 165 is carried by the frame and serves to hold the cord which passes from the needle through the rollers, and thence to a cord box 166 on the side of the shocker. The needle and casing 161 are made adjustable by means of a rack 167, which is secured to the casing 161 and meshes with a pinion 168 mounted on a shaft 169 supported from the frame 155. Any suitable crank mechanism 170 may be employed for adjusting the rack 167. The shaft 169 extends across the machine to the other side thereof and operates a similar rack to adjust the knotter. As shown in Fig. 2, the shaft 149 extends upwardly and serves to operate the knotter. The knotter is illustrated at 171. The knotter which we employ is the one commonly known as the Appleby knotter. We have not thought it necessary to illustrate this knotter in detail, as the operation of this knotter is well known to those skilled in the art. Suffice it to say that the needle 162 is caused to travel across the passageway between the moving chains and carry on the necessary operations, with the knotter to tie the cord.

A suitable inclosure is provided at 172 on each side of the shocker, which is supported from the framework and extends forwardly to the passageway between the chains 96 and 103.

When the machine is in condition to receive the bundles, the needle is in the position indicated in Fig. 2, the twine being held by the knotter 171 and passing through the needle 162 into the twine box. As the bundles pass on down the passage between the chains, they are moved onto the platform 111, causing the twine to extend partly around the bundles. Twine in this position prevents the bundles from tipping over as they move onto the platform, sufficient friction being employed by the rollers 165 to maintain the cord in a substantially taut condition. When the desired number of bundles has been moved onto the platform 111, the lever 146 is operated, causing the rack 156 to be moved first in one direction and then the other to cause the shaft 158 to rotate first in a counter-clockwise direction and then in a clockwise direction (Fig. 2). This movement of the shaft 158 causes the needle 162 to travel across the passageway, engage the knotter, which ties the necessary knot, cuts the cord, and holds the free end of the cord which is connected to the needle. The needle then returns to the position indicated in Fig. 2, to be operated again when the lever 146 is operated.

We will now describe the means which we use for packing the bundles when they are ready to be tied.

Connecting two of the frame bars 155 at the top thereof is a shaft 173, which has loosely mounted thereon and extending rearwardly therefrom a bar 174, upon which is adjustably mounted a packer arm 175. The packer arm 175 is provided with two upwardly extending arms arranged to slidably engage the rod 174, and may be adjusted by means of set screws or equivalent means. Rigidly secured to the packer arm is an L-shaped rod 176, which extends up over the shaft 173, as shown in Fig. 1. Loosely mounted on the shaft 173 is a plate 177, which has pivotally connected therewith a second plate 178. When the plate 178 is in the position indicated in Fig. 4, the same will be caused to engage the extension 179 of the L-shaped bar 176 when it is moved about its shaft 173. Rigidly secured to the shaft 173 is a plate 180 which pivotally supports a lever 181, which in turn is connected by means of a rod 182 to the plate 178. Movement of the lever 181 in a clockwise direction (Fig. 1) will cause the plate 178 to move to the position indicated by the dotted lines and prevent engagement of the plate 178 and arm 179 when the plate 178 is moved toward the rear of the shocker. The plate 178 is connected with a cylinder 183, which has slidably mounted therein a piston 184 which extends into the cylinder 183 against a compression spring 185 disposed between the piston and one end of the cylinder. The left-hand end of the rod 184 (Fig. 1) is attached to an arm 186 mounted on a shaft 187 which is supported by the framework. Secured to the shaft 187 are a plurality of packer arms 188, which when in their normal position extend into the passageway between the endless chains, as shown in Fig. 2. An arm 189 secured to the shaft 187 extends outwardly over the internal gear 160 and is arranged to be operated by a cam 190 carried by the casing of the internal gear.

The operation of the shaft 187 and its associated mechanism is as follows: The shaft 158 is rotated first in a counter clockwise direction (Fig. 2) by means of the rack 156, thereby causing the cam 190 to engage the arm 189 of the shaft 187. The engagement of the cam 190 with the arm 189 causes the shaft 187 to rotate in a clockwise direction, causing the packer arms 188 to assume the position indicated by the dotted lines in Fig. 2. The rotation of the shaft 187 causes the arm 186 to turn in a clockwise direction, thereby causing the lower end of the packer arm to swing inwardly (Fig. 1) and tightly pack the bundles before they are tied. When the packer arm 175 is moved sufficiently to pack the bundles, the piston rod 184 continues to move toward the rear of the shocker, but the packer arm remains stationary, the spring 185 serving to take up the remainder of the movement of the piston 184. It is after this packing has been taken care of that the needle and knotter 171 are caused to operate and tie the bundles. As has previously been described, the shaft 149 extends upwardly and operates the knotter, and terminates at its upper end in a cam 191 adapted to operate a lever 192 pivoted at 193 to one of the frame bars 155. The rear end of the lever 192 is provided with a second lever 194 arranged to engage the lower end of the lever 181. When the cam 191 is rotated sufficiently to cause it to actuate the lever 192, the lever 181 is operated and the plate 178 moved to its dotted position (Fig. 4), thereby removing the stress which had been applied to it by the arm 186 of the shaft 187. Mounted upon the shaft 149 at its lower end is an arm 195 (Fig. 9) which is arranged to engage the lever 134 connected with the shaft 131. This shaft, as has been described, when actuated, throws in the clutch members 122 and 123 and releases the movable platform 116. The packer arm 174 has an extension 196 to which is secured a cord 197 extending over a pulley 198 and secured to the movable platform 116. A cord 199 connects the extension 196 at 200 at one end thereof, and at the other end thereof it connects with a spring 201, which in turn is connected with the framework. When the packer arm is in the position indicated by dotted lines in Fig. 9, the cord 199 is on the left side of the pivot 174, but as soon as the packer arm is moved outwardly, the cord 199 is moved to a position on the right side of the pivot. The spring 201 serves merely to hold it in whichever position it is moved. When the movable platform 116 is in its up position and is carrying a number of bundles to be deposited, and the shaft 131 is caused to rotate so as to unlock the platform 116, the weight of the bundles on the platform will cause the platform to move in the position indicated in Fig. 9. Just as soon as the weight of the bundles is, however, taken off of the platform 116, the weight of the packer arm 174 will return the platform again to its normal position, where it will be held by the locks 127. The opposite side of the platform from that shown in Fig. 9 is connected by means of a cord 202 with a spring 203, which is secured to the frame. The cord 202 is arranged to run over a pulley 204 mounted on the top of the framework. The spring 203 is made adjustable so that the platform 116 will move down when the desired weight is carried by it.

It may here be stated that the rate at which the endless belt 112 travels is substantially the same as the forward movement of the shocker. The object of this can readily be seen when the depositing of the tied bundles is taken into consideration. By having the endless belt moving in a rearward direction at the same rate of speed at which the shocker is moving forwardly, we are enabled to retain the bundles in a stationary position relative to the ground, thereby preventing any tendency of the bundles to tip when they are removed from the platform.

The shocker is connected to the harvester by means of two or more connections. We have shown two connections at 205 extending outwardly at right angles to the shocker and attached to the harvester by means of a set screw, as shown in Fig. 10. A third lever is connected with a hook 206 and the front end of the harvester. Referring to Fig. 10, we have shown a chute at 207, which is adjustably mounted at 208 on the bars 205. This chute 207 is immediately adjacent the hopper 19. The bundles are deposited by the harvester in the position indicated by the dotted lines in Fig. 10, where they are moved by arms 209 to the top of the chute, and then down by gravity onto the hopper 19.

We have found it desirable to connect the shocker with the harvester in such a way that the axle of the tractor wheel 11 will be in alinement with the bull wheel of the harvester. This facilitates turning either one way or the other of both the harvester and shocker without any unnecessary strain on either.

Having thus described our invention, what we claim as new and desire to secure by Letters Patent of the United States, is:

1. A grain shocker comprising a receptacle disposed in a substantially horizontal plane, arranged to receive bundles to be tied, tying means, a passageway leading from said receptacle to said tying means, means for moving said receptacle and bundles to an upright position, chain mechanism carried on each side of the passageway, and fingers carried by said chain mechanism arranged to engage the bundles of grain.

2. A grain shocker comprising a receptacle disposed in a substantially horizontal plane arranged to receive bundles to be tied, means for moving said receptacle and bundles to an upright position, tying means, a passageway leading from said receptacle to said tying means, chain mechanism disposed on each side of said passageway for conveying the bundles from the receptacle to the tying means, and spring mechanism disposed in said passageway for preventing the return of bundles after they have once passed through the passageway.

3. A grain shocker comprising a tying chamber provided with an outlet, a packer arm associated with said tying chamber extending across said outlet when in operating position, means normally connected with said packer arm for moving it to operating position, devices for disconnecting said operating means and packer arm, a tilting floor for the chamber and means connecting the floor and packer arm to cause outward movement of the arm when the floor is lowered.

4. A grain shocker comprising a tying chamber, a U-shaped vertically adjustable packer arm in said tying chamber, tying means in said tying chamber, and means for operating said adjustable packer arm.

5. A grain shocker comprising a tying chamber arranged to receive bundles to be tied, tying means in said tying chamber for tying said bundles, a packer arm forming one of the walls of the chamber, a hinged floor in said chamber arranged to be operated by the weight of the bundles, and means connecting said floor and packer arm so as to cause simultaneous movement of the packer arm and floor to permit the bundles to be removed from the chamber.

6. A grain shocker comprising a tying chamber arranged to receive bundles to be tied, tying means in said chamber for tying said bundles, an arm forming one wall of said chamber, pivoted at a point above the chamber, and means for swinging said arm upwardly when the bundles are to be removed from the chamber.

7. A grain shocker comprising a tying chamber arranged to receive bundles to be tied, tying means in said chamber for tying said bundles, a removable wall in said tying chamber pivoted at a point above the chamber, and means for swinging said wall upwardly to a substantially horizontal position when the bundles are to be removed from said chamber.

8. A grain shocker comprising a tying chamber arranged to receive bundles to be tied, a tilting platform having one end pivoted to the framework of the shocker, said platform forming a floor for the chamber, an endless belt on said platform, means for operating said belt, clutch mechanism interposed between the belt and said operating means adapted to be moved to operating position when the platform is moved downwardly, a catch for holding the platform in its up position, the weight of the bundles serving to lower the platform when the catch is moved to release the same, and a spring for returning the platform to its up position after the bundles have been removed from the platform.

9. A grain shocker comprising a tying chamber arranged to receive bundles to be tied, a tilting platform for said tying chamber forming a floor for the chamber, said platform being pivoted at one end to the casing of the shocker, a catch for holding the platform in its up position, the weight of the bundles serving to lower the platform when the catch is moved to release the same and a spring for returning the platform to its up position after the bundles have been removed therefrom.

10. A grain shocker comprising a casing provided with two backwardly-extending brackets, a tying chamber disposed between said brackets, a movable platform hinged to said brackets and disposed therebetween, and a wheel adapted to be vertically adjusted mounted in each of the backwardly-extending brackets.

11. A grain shocker comprising a casing provided with two rearwardly-extending brackets, a tying chamber mounted between said rearwardly-extending brackets, a tilting platform disposed between said brackets, a wheel carried by each of said brackets, and a single tractor wheel carried near the front of the shocker.

12. A grain shocker comprising a casing provided with two rearwardly-extending brackets, a tying chamber disposed between said brackets, a tilting platform hinged to said brackets and disposed therebetween, a vertically adjustable wheel carried by each of said brackets, and a single tractor wheel carried near the front of the shocker.

13. A grain shocker comprising a casing provided with two rearwardly-extending brackets, a tying chamber disposed between said brackets, a tilting platform hinged to said brackets and disposed therebetween, a wheel carried by each of said brackets, and a single tractor wheel carried near the front end of said shocker and in substantially the center thereof.

14. A grain shocker comprising a tying chamber arranged to receive bundles to be tied, a platform forming a floor for the chamber pivoted at its front edge to the frame work of the shocker so as to permit its rear edge to engage the ground, means for holding said platform in its raised position, and devices for engaging the bundles when they are deposited on the ground so as to prevent tipping of the same.

15. A grain shocker comprising a tying chamber arranged to receive bundles to be tied, a platform forming a floor for the chamber pivoted at its front edge to the frame work of the shocker so as to permit its rear edge to engage the ground, means for holding said platform in its raised position, and devices for engaging the rear edge of the bundles when they are deposited on the ground so as to prevent tipping of the same.

16. A grain shocker comprising a tying chamber arranged to receive bundles to be tied, a platform forming a floor for the chamber pivoted at its front edge to the frame work of the shocker so as to permit its rear edge to engage the ground, means for holding said platform in its raised position, and a packer arm adapted to engage the bundles when they are deposited on the ground so as to prevent tipping of the same.

17. A grain shocker comprising a tying chamber arranged to receive bundles to be tied, a platform forming a floor for the chamber pivoted at its front edge to the frame work of the shocker so as to permit its rear edge to engage the ground, means for holding said platform in its raised position, and a packer arm adapted to engage the rear edge of the bundles when they are deposited on the ground so as to prevent tipping of the same.

18. A grain shocker comprising a tying chamber arranged to receive bundles to be tied, a platform forming a floor for the chamber pivoted at its front edge to the frame work of the shocker so as to permit its rear edge to engage the ground, means for holding said platform in its raised position, devices for engaging the bundles when they are deposited on the ground so as to prevent tipping of the same, and mechanism connecting said devices and platform to cause simultaneous operation of both.

19. A grain shocker comprising a tying chamber arranged to receive bundles to be tied, an endless belt forming a floor for the chamber, tilting means for supporting said endless belt pivoted to the framework of the shocker so as to permit a portion of the endless belt to assume a position near the ground, means for holding said tilting means in its raised position, and devices for engaging the bundles when they are deposited on the ground so as to prevent tipping of the same.

20. A grain shocker comprising a tying chamber arranged to receive bundles to be tied, a platform forming a floor for the chamber pivoted at its front edge to the framework of the shocker so as to permit its rear edge to engage the ground, means for holding said platform in its raised position, and a substantially U-shaped vertically swinging arm for engaging the bundles when they are deposited on the ground so as to prevent tipping of the same.

In witness whereof, we hereunto subscribe our names, in the presence of two witnesses, this 10th day of August, A. D. 1914.

FLOYD W. HART.
ORREN E. BARBER.

Witnesses:
O. ALBERTSON,
PETER J. A. SCHNOOR.

Copies of this patent may be obtained for five cents each, by addressing the "Commissioner of Patents, Washington, D. C."